United States Patent
Hänsli et al.

(10) Patent No.: US 9,816,654 B2
(45) Date of Patent: Nov. 14, 2017

(54) RAPID COUPLING

(71) Applicant: OETIKER SCHWEIZ AG, Horgen (CH)

(72) Inventors: Willi Hänsli, Horgen (CH); Urs Müller, Horgen (CH)

(73) Assignee: Oetiker Schweiz AG (CH)

( * ) Notice: Subject to any disclaimer, the term of this patent is extended or adjusted under 35 U.S.C. 154(b) by 0 days.

(21) Appl. No.: 15/110,145

(22) PCT Filed: Oct. 17, 2014

(86) PCT No.: PCT/EP2014/072373
§ 371 (c)(1),
(2) Date: Jul. 7, 2016

(87) PCT Pub. No.: WO2015/104073
PCT Pub. Date: Jul. 16, 2015

(65) Prior Publication Data
US 2016/0348821 A1    Dec. 1, 2016

(30) Foreign Application Priority Data
Jan. 10, 2014  (DE) ........................ 10 2014 000 387

(51) Int. Cl.
*F16L 35/00*     (2006.01)
*F16L 37/088*    (2006.01)
*F16L 37/08*     (2006.01)
*F16L 37/12*     (2006.01)

(52) U.S. Cl.
CPC ............. *F16L 37/088* (2013.01); *F16L 37/08* (2013.01); *F16L 37/12* (2013.01); *F16L 2201/10* (2013.01)

(58) Field of Classification Search
USPC .... 285/387, 388, 86, 93, 302, 303, 321, 307
See application file for complete search history.

(56) References Cited

U.S. PATENT DOCUMENTS 4,451,069 A * 5/1984 Melone ............... F16L 37/0842
                                                            285/315
5,749,606 A    5/1998 Lu et al.

FOREIGN PATENT DOCUMENTS

| EP | 0 226 689 A1 | 7/1987 |
| EP | 0 467 381 A2 | 1/1992 |
| WO | 2005/052431 A1 | 6/2005 |

OTHER PUBLICATIONS

Search Report and Written Opinion for International Patent Application No. PCT/EP2014/072373; dated Jan. 23, 2015.

* cited by examiner

*Primary Examiner* — Aaron Dunwoody
(74) *Attorney, Agent, or Firm* — Barnes & Thornburg LLP

(57) ABSTRACT

In a rapid coupling, a pipe nipple engages a through hole of a socket. A first annular groove provided on the pipe nipple serves to catch a locking ring provided in the socket, in order to lock the coupled condition. A sleeve is movable on the pipe nipple, the sleeve having an inner projection to be retained by the first annular groove of the pipe nipple in a pre-assembled condition. When the pipe nipple is inserted into the socket, the sleeve abuts the socket and is then moved along the pipe nipple until the inner projection is caught by a second annular groove if the coupling is properly locked. It the pipe nipple is not moved into the socket to such an extent that the locking ring is caught by the first annular groove, the second annular groove remains visible outside the sleeve to indicate the improper coupling condition.

9 Claims, 2 Drawing Sheets

RAPID COUPLING

PRIORITY CLAIM

This patent application is a U.S. National Phase of International Patent Application No. PCT/EP2014/072373 filed 10 Oct. 2014, which claims priority to German Patent Application No. 10 2014 000 384.6, filed 14 Jan. 2014 the disclosure of which are incorporated herein by reference in their entirety.

SUMMARY

Illustrative embodiments relate to, at least in part, drawbacks as occur with comparable prior art rapid couplings. More specifically, illustrative embodiments may provide a rapid coupling in which the locking condition between the pipe nipple and the socket can be detected by an inexpensive additional element.

The sleeve provided may be a simple and light-weight structural element which presents the following advantages over the known rapid coupling:

(a) The compression spring, which is present in the known rapid coupling and increases the required space within the coupling, may be omitted. The coupling of the disclosed embodiments has a smaller overall length.

(b) Because no spring force has to be overcome when the pipe nipple is moved into the socket, the coupling of the disclosed embodiments may be more effortless to handle.

(c) The sleeve employed in the disclosed embodiments may be disposed on the outer side of the pipe nipple and—other than the compression spring of the known coupling—does not contact the fluid being conducted.

(d) The sleeve may have no influence on the interior design of the socket.

(e) The outer sleeve may be used to protect the socket of the coupling against dirt.

The embodiments of the disclosed embodiments may be particularly useful in view of its manufacture and handling.

In accordance with at least one embodiment, the sleeve has the additional function of protecting the coupling against pollution.

In accordance with at least one embodiment, the sleeve may have an elasticity advantageous for its functioning.

In accordance with at least one embodiment, the locking condition of the coupling may be precisely visible.

BRIEF DESCRIPTION OF THE DRAWINGS

A disclosed embodiment will be explained in more detail below with reference to the drawings, in which.

DETAILED DESCRIPTION OF EMBODIMENTS

Figure 1:
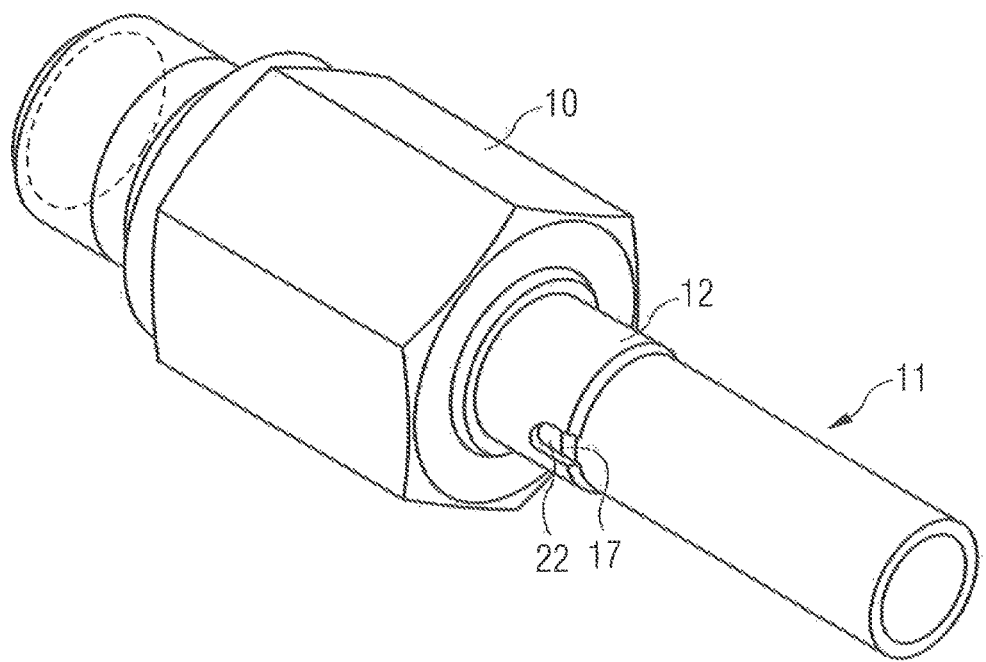
FIG. 1 shows the rapid coupling in the locked condition.

The rapid coupling shown in FIG. 1 has a socket 10, a pipe nipple 11 adapted to be inserted into the socket, and a sleeve 12 slidable on the pipe nipple 11.

Figure 2:
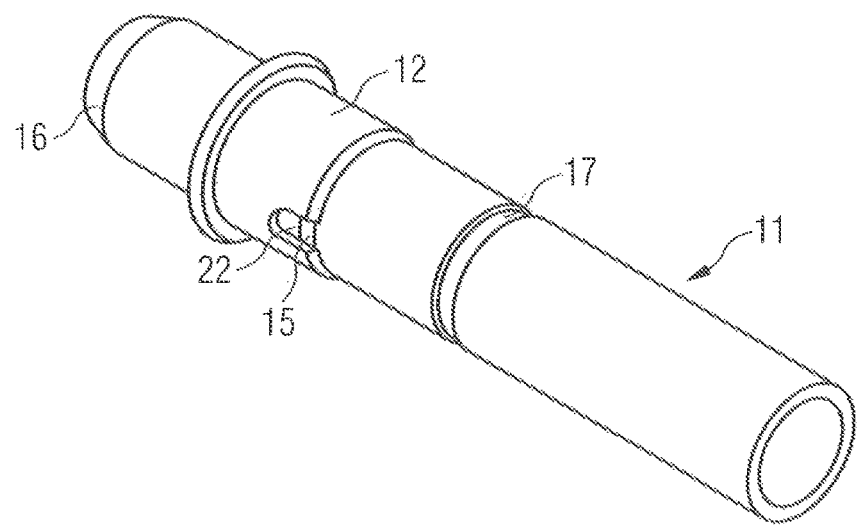
FIG. 2 shows the pipe nipple used in the coupling of FIG. 1,
FIGS. 3 and 4 show the sleeve used in the coupling of FIG. 1,
FIGS. 5 and 6 show an alternative embodiment of the sleeve.

In accordance with FIG. 2, pipe nipple 11 is provided with a first annular groove 15 and a second annular groove 17 spaced therefrom and disposed on the side of the pipe nipple 11 remote from an insertion end 16. The first annular groove 15 serves to catch a locking ring (not shown) disposed inside the socket and also to hold the sleeve 12 in a pre-assembled position. The second annular groove 17 serves as an indicator for the locking condition of the coupling.

Figure 3:
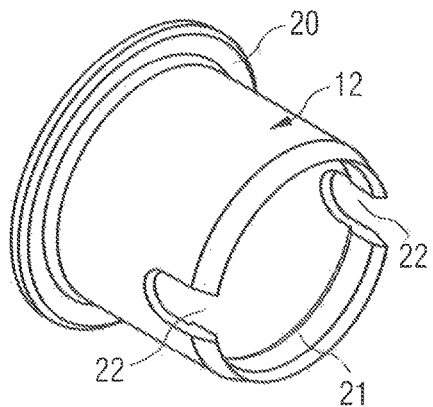
Figure 4:
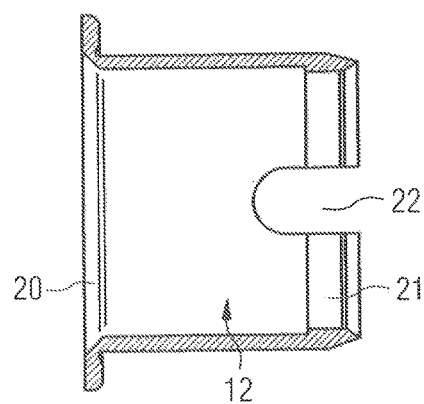

The sleeve 12 shown in FIGS. 3 and 4 has at its one end an outward projecting flange 20 which abuts the socket 10 in the assembled condition of the coupling. Near its opposite end inside the sleeve 12 there is an annular projection 21 which is so dimensioned that it can catch in the annular grooves 15, 17. At this end, the sleeve 12 further has two opposite cut-outs 22 which extend beyond the axial width of the projection 21. These cut-outs are necessary for the projection 21 to catch in the annular grooves 15 and 17.

When assembling the coupling, the sleeve 12 is first mounted on the pipe nipple 11 until it is caught by the first annular groove 15 and retained there. The pipe nipple 11 is pushed into the socket 10 until the first annular groove 15 is caught by the looking ring disposed inside the socket 10, thereby locking the coupling. During this movement, the sleeve 12 first abuts with its flange 20 at the end wall of the socket 10 and is then pushed along the pipe nipple 11.

In the locked condition, in which the locking ring is caught by the first annular groove 15 of the pipe nipple 11, the inner projection 21 is caught by the second annular groove 17. This is recognizable by the fact that the second annular groove 17 disappears in the sleeve 12. In addition, the catching of the projection 21 of the sleeve 12 by the second annular groove 17 becomes visible in the area of the cut-outs 22. If the annular groove 17 is visible after the assembly, this indicates that the assembling process was incomplete.

In addition to this indicator function, the cut-outs 22 give the sleeve 12, which may be made of metal or plastic, a certain elasticity so that the sleeve 12 is retained on the pipe nipple 11 also outside the annular grooves 15, 17.

To release the coupling, the pipe nipple 11 is pulled out of the socket 10. The release process is done with a release tool which may take the form shown for instance in FIG. 12 of EP 0 467 381. After the sleeve 12 has been pushed back, the two tubular halves of that tool may be inserted in the gap between the pipe nipple 11 and the opening of the socket 12 to release the locking ring from the first annular groove 15.

The same release tool may be used for pushing the sleeve 12 from the annular groove 17 back into annular groove 15. This permits a multiple use of the sleeve 12.

Figure 5:
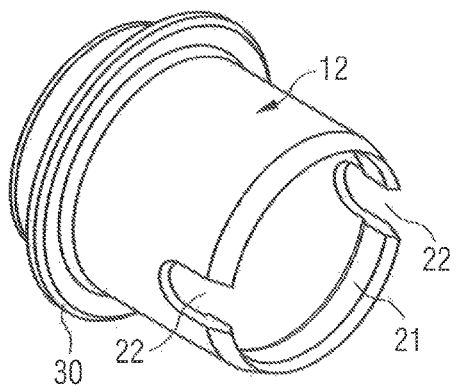
Figure 6:
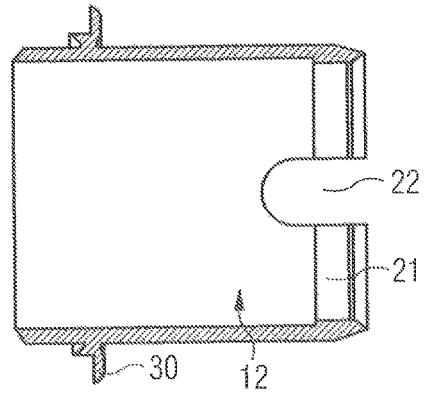

In the alternative embodiment of FIGS. 5 and 6, the end flange of the sleeve 12 is replaced by an outer sealing lip 30 spaced from the end of the sleeve which sealing lip not only serves as a limit stop at the end of the socket 10 but additionally provides a protection against the entry of dirt into the inside of the coupling.

A rapid coupling having the features included in the preamble part of claim 1 is known from WO 2005/052431. There, the pipe nipple is pushed into the socket against the force of a compression spring until a circumferential groove provided on the pipe nipple catches in a locking ring disposed within the socket. The compression spring is so dimensioned that it pushes the pipe nipple out of the socket as long as the coupling is not locked by the circumferential groove catching the locking ring. The annular groove thus remains visible outside of the socket thereby indicating that the coupling is not locked.

REFERENCE NUMBERS

10 Socket
11 pipe nipple

12 Sleeve
15 first annular groove
16 insertion end of the pipe nipple 11
17 second annular groove
20 Flange
21 Projection
22 cut-outs
30 sealing lip

The invention claimed is:

1. A rapid coupling comprising:
   a socket;
   a pipe nipple having an insertion end configured for insertion into the socket and having a first depression for locking the pipe nipple within the socket; and
   a sleeve configured to be slid onto the pipe nipple, the sleeve having a formation to be placed against the socket and an inner projection for engaging the first depression of the pipe nipple,
   wherein the pipe nipple has a second depression on a side remote from the insertion end, the second depression receiving the inner projection of the sleeve in the locked condition of the pipe nipple and the socket thereby rendering the locked condition recognizable by the fact that the second depression is not visible within the sleeve.

2. The rapid coupling of claim 1, wherein both depressions on the pipe nipple are formed as annular grooves.

3. The coupling of claim 1, wherein the projection in the sleeve is annular.

4. The rapid coupling of claim 1, wherein the sleeve has an outer projection for abutting the socket.

5. The rapid coupling of claim 4, wherein the outer projection is an annular flange integral with an end of the sleeve.

6. The rapid coupling of claim 4, wherein the outer projection is formed as a sealing lip on the periphery of the sleeve.

7. The rapid coupling of claim 1, wherein the end of the sleeve remote from the socket is slotted.

8. The rapid coupling of claim 7, wherein the sleeve has two opposite cut-outs which leave the second depression of the pipe nipple visible in the non-locked condition of the coupling.

9. The coupling of claim 2, wherein the projection in the sleeve is annular.

* * * * *